UNITED STATES PATENT OFFICE.

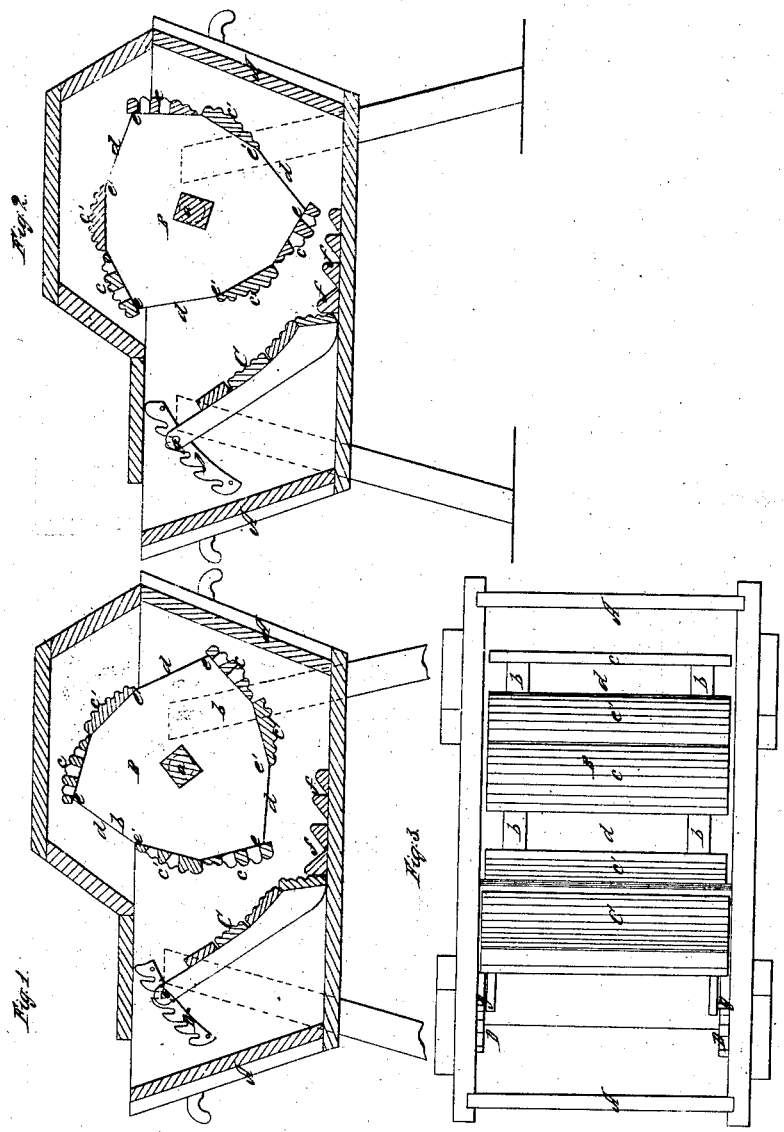

N. B. CLABAUGH, OF FREDERICK, MARYLAND.

IMPROVED WASHING-MACHINE.

Specification forming part of Letters Patent No. 45,317, dated December 6, 1864.

*To all whom it may concern:*

Be it known that I, N. B. CLABAUGH, of Frederick, county of Frederick, State of Maryland, have invented a new and Improved Washing-Machine; and I do hereby declare that the following is a full, clear, and exact description thereof, reference being had to the accompanying drawings, making a part of this specification, in which—

Figure 1 is a longitudinal section through the improved washing-machine, taken in a vertical plane. Fig. 2 is a similar section showing the rotating rubber in a position for acting upon the articles in the machine. Fig. 3 is a top view with the cover removed.

Similar letters of reference indicate corresponding parts in the three figures.

The object of my invention is to so construct a rotating slatted rubber that when it is combined with an inclined wash-board it will operate intermittently upon the articles placed in the tub, and not only squeeze and rub them, but also allow them to open and absorb water after each squeezing and rubbing operation, as will be hereinafter described.

To enable others skilled in the art to make and use my invention, I will describe its construction and operation.

In the accompanying drawings, A represents the wash-box, which is made with vertical sides and inclined ends; and B represents a rotating rubber, which is supported by a horizontal transverse crank-shaft, $a$, passing through its heads $b\ b$ and resting in bearings in the sides of the wash-box. This rubber is chiefly composed of slats or strips $c\ c'$, having roughened or corrugated surfaces, which latter are also slightly curved, as shown in Figs. 1 and 2. The heads of the rubber, to which these corrugated and convex-surface slats are secured, are polygonal, and the slats $c\ c'$ are arranged in pairs, so as to leave a space between each pair, as indicated at $d$. These three points $d\ d\ d$ of the rubber are considerably nearer the shaft $a$ than the surfaces of the slats $c$, and the slats $c'$ gradually approach said shaft as they diverge from the planes of the slats $c$. The three angles $e\ e\ e$ are the farthest from the axis of the rubber B, and the angles $e'\ e'\ e'$ are nearest said axis. By this form of rubber I obtain an intermitting rubbing and pressing action of the slats $c\ c'$ upon the articles placed in the tub, as will be hereinafter shown.

The slats may be made up of narrow bars, or they may be made of wide strips having perforations through them. Those which are lettered $c$, and which give the greatest pressure to the articles in the tub, may be perforated, while those lettered $c'$, which perform the rubbing, may be made solid or left imperforated.

On the bottom of the wash-tub A, and arranged a little on one side of the rubber B, are a number of rounded bars, $f\ f$, which gradually increase in size, and which extend transversely across the bottom of the tub. In conjunction with these bars $f$, I employ an inclined wash-board, C, the lower end of which rests upon the bottom of the tub and is very slightly inclined, while the upper surface is curved, so as to present a concave rubbing-surface, as clearly shown in Figs. 1 and 2. The upper ends of this wash-board C have pins $g$ projecting from them and entering notches formed in segmental side supports, D D, which latter form supports for said wash-board when it is arranged in different planes.

In Fig. 1 I have represented the rubber B in a position for receiving articles under it to be washed, and in Fig. 2 this rubber is represented in a position for acting upon the articles. It will be seen that in the former instance one of the spaces $d$ of the rubber is brought over the fixed rubbing slats or bars $f$ on the bottom of the tub, and as the radius of the rubber B is very short at this point $d$, a very large space will be left between it and the bottom of the tub, sufficient to allow the articles to be washed to work themselves directly beneath the rubber, in a position to be acted upon by the succeeding pair of rubbing and pressing slats $c\ c'$. In Fig. 2 these slats $c\ c'$ are represented as acting upon the articles, which are partially held in place by means of the fixed slats or bars $f$. As the extreme outer edge of the slat $c$ is moved toward the articles, they receive a considerable pressure from it, and are at the same time rolled over to present new surfaces to be acted upon by the succeeding rubbing and squeezing slats $c\ c'$; but before this second operation takes place another space $d$ is brought over the articles, and they are allowed to absorb water and soap again. By the peculiar eccentric arrangement of the rubbing and squeezing slats upon the heads of the rotating rubber it will be seen that the operation of each pair of these slats is gradually augmented, and that the greatest pressure occurs at the points $e\ e\ e$, while the least pressure occurs at the points $e'$; hence the articles are rubbed and pressed.

The object of providing for adjusting the upper end of the wash-board C is to adapt the machine for washing either very large or very small articles, and to facilitate the removal of articles from the tub after they have been washed.

Having thus described my invention, what I claim as new, and desire to secure by Letters Patent, is—

1. The rubber and squeezer constructed with openings $d\ d$ between the rubbing and squeezing devices, substantially as and for the purposes set forth.

2. The combination of a polygonal rotating rubber, B, with a wash-board, C, and slatted bed $f$, substantially as described.

N. B. CLABAUGH.

Witnesses:
H. WINCHESTER,
J. M. HARDING.